3,340,024
COMPACTING OF PARTICULATE METALS
John H. Mahar, Scotch Plains, N.J., assignor to Esso Research and Engineering Company, a corporation of Delaware
No Drawing. Filed June 4, 1965, Ser. No. 461,554
15 Claims. (Cl. 29—192)

This invention relates to the art of forming briquettes. In particular, it relates to the method of compacting particulate metals solids particles to form rigid shapes, coherent masses, aggregates, or briquettes, as well as to the products produced pursuant to such method.

In relatively recent years in view of diminishing iron ore reserves and the increasing need for iron and steel, consideration of methods for producing iron and steel has again shifted to direct iron ore reduction. The methods most often contemplated involve reduction of finely divided iron ore solids particles, especially oxidic iron ores, while the latter is suspended as a fluidized bed, or beds, in upwardly flowing gases, or mixtures of such gases, and reduced at temperatures below the sintering or fusion temperature of the specific ore.

Generally, the particulate ore solids are staged in separate reduction zones, or beds, and gradually reduced through the several stages of oxidation as the fluidized ore is passed successively from one bed to the next and countercurrently contacted by reducing gases. The ore is thus generally reduced from, e.g., ferric oxide to magnetic oxide of iron, and thence to ferrous oxide, and finally to substantially metallic iron. Upon withdrawal, the metallic iron product, generally from about 80 percent to about 95 percent metallized, can be compacted between opposing members at high pressure and sufficiently agglomerated to form generally porous masses.

Upon discharge from the reduction process the very finely divided iron particles are at high temperatures and must be cooled considerably, e.g., to temperatures below about 400° C. or 500° C., prior to discharge into the atmosphere. Even after cooling to relatively low temperatures, however, a host of problems are presented.

A problem of primary concern is that of reoxidation. Upon contact of the finely divided particles with the atmosphere, and even after briquetting, reoxidation can occur. Reoxidation is, in fact, a major problem not only at the time briquettes are formed, but long after the briquettes are cooled and placed in storage. Thus, in the presence of atmospheric moisture, the briquettes readily and severely back-oxidize, not only on the surface but even within the interior of the briquette. The reoxidation problem is especially severe because the briquettes most often must be transported over long distances, subjected to various climatic extremes, and generally must remain in inventory for long periods even after arrival at a destination. The problem is particularly acute if, in the shipment and storage of the briquettes, the briquettes should be wetted, e.g., by rain.

The moisture problem and that of reoxidation is all the more severe with regard to briquettes than in the case of oridinary iron. Thus, the briquettes are in reality a compacted mass of particles which are adhered, one particle to another, to form relatively porous aggregates. As such, the product, often referred to as "sponge iron," has a tremendous surface as well as inside voids. Moreover, the iron, per se, from a fluidized iron ore reduction process, is not like ordinary iron powder but rather is highly activated and its tendency to back-oxidize is extremely aggravated. In fact, in situations where these briquettes have become wetted, visible evidence of vigorous hydrogen evolution has often been observed.

Moisture, per se, can also produce major problems aside sary step in many steel-making operations. If wetted briquettes can contain considerable water, especially where the internal or void space is high. Such briquettes can "soak up" considerable water and when so wetted cannot, e.g., be covered with molten metal, such as is a necessary step in many steel-making operations. If wetted briquettes were so treated, the water would expand rather abruptly, violently, and with considerable force. Conceivably, at the high temperatures the water could also decompose and the oxygen react violently with the carbon present in the steel-making furnace.

A further problem is concerned with the physical handling of the briquettes. The briquettes must have a very high crushing strength if they are not to crumble when stacked and subjected to considerable forces or pressures. Degeneration of the briquettes into fines and splinters in the inevitable knocks produced during handling can be particularly onerous and this presents a problem of major proportions.

In view of these and other difficulties, it is accordingly an object to provide a new and improved process for forming briquettes which will obviate these and certain other problems. In particular, it is an object to provide such process which will provide briquettes with lesser void spaces, greater resistance to crushing and degeneration into fines as a result of handling, and which are quite resistant to back-oxidation. It is also an object to provide novel briquettes with unique properties.

These and other objects are produced in accordance with the present invention which contemplates the use, as binders, of certain oxygenated compounds or additives added to, incorporated, or otherwise mixed and present with finely divided or particulate metals, especially particulate reduced iron such as results from a direct iron ore reduction process, during the formation of aggregate masses or briquettes from such metals. It has thus been found that small quantities of alcohols can be admixed or incorporated with particulate metals and the mixture pressed, e.g., between opposing members or surfaces, to form rigid shapes, aggregates, or briquettes. The alcohols employed are preferably the higher molecular weight alcohols containing from about 6 to about 30 carbon atoms in the molecule. Illustrative of suitable alcohols are monohydric primary alcohols such as hexyl alcohol, decyl alcohol, cetyl alcohol, melissyl alcohol, and the like; monohydric secondary alcohols such as methyl heptyl alcohol, butyl octyl alcohol, octyl dodecyl alcohol, tetradecyl cetyl alcohol, and the like; and monohydric tertiary alcohols, triethylcarbinol, and the like. Polyhydric alcohols as hexamethylene glycol, and the like can also be used.

The monohydric primary alcohols, especially those containing one or more branched structures per molecule are, more preferably, employed. Even more preferably, branched chain monohydric alcohols containing an ether linkage adjacent the alcohol group are utilized in formation of the briquettes to produce stronger bonding characteristics.

Such compounds, especially the branched chain monohydric alcohols containing from about 8 to about 16 carbon atoms in the molecule, particularly those containing the ether linkage adjacent the alcohol group, prove to be superior binders for briquetting particulate metals, especially iron. These binders are particularly effective with activated forms of iron, particularly reduced iron such as produced in a fluidized iron ore reduction process; and more particularly reduced iron which ranges from about 70 to about 95 percent, and higher, metallization. Significantly higher strengths, especially compressive strength, inter alia, is obtained as compared to the compacting and agglomeration of particulate metals, per se, i.e., without use of a binder, as contrasted with the use of most known binders.

The preferred classes of alcohols for use in the practice of this invention can be represented by the following formula:

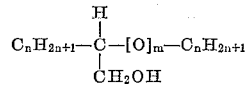

wherein:

$n$ is an integer greater than 1, and preferably does not exceed 14; but more preferably ranges between 3 and 7; and $m$ is 0 or 1, and is preferably 1.

Preferably, the $C_nH_{2n+1}$ moieties of the molecule differ from each other by no more than one carbon atom.

These especially preferred classes of alcohols are thus characterized as monohydric primary alcohols branched from the alpha carbon atom of the molecule, i.e., the carbon atom adjacent the alcohol group. The $C_nH_{2n+1}$ moieties range preferably from 2 to about 14 carbon atoms. Such alcohols are often referred to as dimer alcohols and alkoxy alcohols, the former occurring where $m$ of the above formula is zero and the latter where $m$ is one. The dimer alcohols are branched chain monohydric alcohols containing an alcohol oxygen. The alkoxy alcohol (oxo alcohol) contains two oxygen atoms, one in the capicity of an ether oxygen and the other as an alcohol. Exemplary of such alcohols are such alkoxy alcohols as iso-propoxy isoamyl alcohol, iso-propyl isohexyl alcohol, iso-butyl isoheptyl alcohol, iso-octyl isononyl alcohol, iso-decanyl isododecanyl alcohol, iso-tetradecanyl isohexadecanyl alcohol, and the like.

A superior binder used pursuant to this invention is the heavy residual fraction resulting from alcohol manufacture in accordance with the oxo process. In the oxo process for manufacture of alcohol, an olefin feed is reacted under pressure, and in the presence of a suitable catalyst, with carbon monoxide and hydrogen. In the primary reaction, an aldehyde containing one more carbon atom than present in the original feed olefin molecule is produced. The aldehyde is hydrogenated to the corresponding primary alcohol. Other compounds, essentially higher molecular weight alcohols, are produced in side reactions.

The bottoms from such process, i.e., the residual remaining after removal of the unreacted olefins and lower molecular weight alcohol, contains a fraction consisting essentially of dimer alcohols and alkoxy alcohols containing generally from about 8 to about 16 carbon atoms. About one-half of the alcohols present are alkoxy alcohols. This fraction, boiling (at 50 millimeters of mercury) within a range of from about 300° F. to about 475° F., can be mixed in low concentration with particulate metals, especially iron, and the resultant mass aggregated as briquettes. The resultant briquettes provide extremely high resistance to crushing and high resistance to back-oxidation. Formation of the briquettes under proper conditions can considerably lessen internal or void spaces.

In forming briquettes, sufficient quantities of the additive compounds, or mixtures of such compounds, are added to particulate metals, or mixtures thereof, so that upon application of force the total mass can be compacted to form aggregates. Generally, from about 0.05 to about 10 percent of the additive compounds, based on the weight of the metal, is thoroughly admixed with the particulate metal, e.g., iron powder. From about 1 to about 4 percent of the additive compound, or compounds, is mixed with the particulate metal in most circumstances. For best results, generally not more than about 2 percent of the additive compound, or compounds, is required. Following the mixing step, the mixture of binder and metal is pressed with force sufficient to produce an aggregate mass or briquette. Suitably, such pressures range from about 20,000 pounds per square inch and higher, and preferably pressures ranging about 50,000 to about 100,000 pounds per square inch are employed. Briquettes formed in such fashion are found to provide, e.g., far greater resistance to crushing, i.e., compressive strength, than briquettes formed without the use of such additives or binders. They are also more crush resistant than briquettes formed with conventional residual or polymeric substances.

In a particularly preferred embodiment, the briquettes made from reduced iron, especially reduced iron from a fluidized iron ore reduction process, are cured after their formation. The curing of the briquettes is effected by heating at temperatures ranging from about 250° F. to about 600° F., and preferably from 350° F. to about 500° F., for a time sufficient to drive off most of the volatiles from the briquette. Generally, heat treatment in air ranging from about 1 hour to about 24 hours is adequate to cure the briquettes. Briquettes so cured possess about twice or greater the compressive strength than uncured briquettes. This is indeed surprising for most metal briquettes, even briquettes formed from pure iron powder, do not show substantial increase in compressive strength after curing. In fact, certain particulate metals, e.g., nickel and even pure iron powder, have shown substantial decreases in compressive strength after curing.

The reason for the effectiveness of these compounds as binders for particulate metals, especially iron, is not known. The compounds adhere tightly to the surfaces of the metals solids particles and cause the individual metal particles to adhere or bond together. The applied pressure, or the compression of the particles, forms the individual metal particles into rigid coherent bodies or aggregate masses. While applicant has no desire to be bound by theory, it is believed that the oxygen atom of the alcohol group coordinates with the metal to provide unpaired electrons to the metal. In this regard, it is believed that the ether atom of an alkoxy alcohol is bifunctional in that it provides two oxygen atoms, i.e., the alcohol oxygen and the ether oxygen. The curing step apparently aids in the formation of such coordinate structures where a highly active metal surface is present. Whatever the mechanism involved, however, the result is particularly surprising because it is known that such compounds are completely ineffective as binders in the formation of briquettes from normal building materials.

The following nonlimiting examples and pertinent demonstrations bring out the more salient features and provide a better understanding of the invention.

*Example 1*

Particulate iron, from about 80 to about 95 percent metallized, is withdrawn from a fluidized iron ore reduction process at 1400° F. and cooled under a blanketing layer of nitrogen.

The particulate iron is admixed with two weight percent of a residual fraction from an oxo process containing predominantly monohydric primary alcohols (approximately one-half dimer alcohols and one-half alkoxy alcohols) ranging from about 8 carbon atoms to about 16 carbon atoms. Portions of the mixture are then compacted at 75,000 pounds per square inch in a ram type hydraulic press to form individual briquettes. Tests on the briquettes after removal from the press show that the briquettes can withstand a pressure of 37,300 pounds per square inch before being crushed.

In sharp contrast, however, when briquettes are formed under identical conditions except that several generally conventional binders are utilized, the crushing strengths of the briquettes range from a low of 17,200 to a high of 24,800 pounds per square inch. The advantages of using the binder of the present invention are apparent inasmuch as crushing strength is improved approximately fifty percent over even the best of the conventional binders used in the tests.

*Example 2*

When several of the briquettes of Example 1 formed from the novel binders of the present invention are cured at 400° F. in air for sixteen hours, a pressure of 55,500 pounds per square inch is required to crush the briquettes. The cured briquettes of this invention thus possess a crushing strength approximating 225 percent greater than the best of the conventionally formed briquettes.

*Example 3*

When Example 1 is repeated using particulate nickel, manganese, chromium, lead-antimony alloy, and titanium, respectively, satisfactory results are again obtained.

*Example 4*

The following is a tabulation of crushing strengths, in pounds per square inch, wherein Example 1 is repeated except that two weight percent of selected alcohols are employed as additives—viz., decyl alcohol, octyl alcohol, 1,4-butanediol and ethylene glycol, respectively—for the formation of ⅜-inch diameter briquettes. The briquettes are prepared from 82 percent metallized reduced iron from a fluidized iron ore reduction process. Data are given of crushing strengths obtained before (uncured) and after curing (cured) for 16 hours in air at 400° F.

| Additive | Crushing Strength, p.s.i. | |
| --- | --- | --- |
| | Uncured | Cured |
| Decyl alchohol | 30,600 | 51,000 |
| Octyl alcohol | 35,500 | 50,000 |
| 1,4-butanediol | 25,600 | 38,300 |
| Ethylene glycol | 27,300 | 39,000 |

The advantages achieved are apparent.

These specific embodiments of the invention which have been described are illustrative, only, and the invention is applicable to particulate metals and alloys of metals, and to mixtures of such metals, particularly certain metals of Groups IV, V, VI, VII and VIII of the Periodic Chart of the Elements.

It is apparent that certain changes and modifications can be made in the process, and in the briquette which is formed, without departing from the spirit and scope of the present invention.

A feature of the invention resides in the novel classes of alcohols which are incorporated with particulate metals to form briquettes. By the use of such compounds, high quality briquettes can be formed which have very high crushing strengths. Moreover, briquettes can be formed which are highly resistant to back-oxidation, water absorption and retention, and the like. Moreover, the curing step is a highly desirable feature giving rise to even greater benefits than obtained by formation of the briquettes without such additional treatment.

Particulate metals can be compacted between opposing members to form briquettes or aggregates in any of a variety of ways including the use of presses, roll mills, extrusion apparatus, and the like. Extrusion techniques are also satisfactory in the formation of briquettes and lesser pressures are generally needed than when using, e.g., a ram type hydraulic press. The additives of this invention, in themselves, provide a salubrious effect in the actual formation of briquettes so that lesser force is required and there is less wear on the metal parts constituting the compacting or extruding apparatus. Particulate metals can also be pelletized with mixtures of these additives via use of appropriate pelletizing apparatus.

Having described the invention, what is claimed is:

1. A process for producing briquettes comprising admixing particulate metals with from about 0.05 to about 10 percent, based on the weight of the metal, of an additive compound characterized as follows:

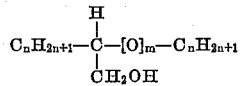

wherein:

$n$ is an integer ranging from 2 to about 14, $m$ is 0 to 1, pressing the mixture between opposing surfaces, and exerting pressures ranging from about 20,000 pounds per square inch and higher to form a briquette.

2. The process of claim 1 wherein the additive compound employed is a dimer alcohol.

3. The process of claim 1 wherein the additive compound employed is an alkoxy alcohol.

4. The process of claim 1 wherein the additive compound employed is a mixture of dimer and alkoxy alcohols.

5. The process of claim 1 wherein the mixture is constituted of alcohols containing from about 8 to about 16 carbon atoms in a molecule.

6. The process of claim 1 wherein the compound is employed in concentration ranging from about 1 to about 4 percent.

7. The process of claim 1 wherein the metal employed in forming the briquette is substantially reduced iron.

8. The process of claim 7 wherein the metal employed is from about 70 to about 95 percent metallic iron as resultant from a fluidized iron ore reduction process.

9. A process for producing briquettes comprising admixing particulate reduced iron metal with a monohydric primary alcohol containing from about 6 to about 30 carbon atoms, in concentration ranging from about 1 to about 4 percent, based on the weight of the iron, to form a mixture, pressing the mixture between opposing surfaces at pressures ranging from about 20,000 pounds per square inch and higher to form a briquette, and then treating the briquette in an oxygen-containing atmosphere at temperatures ranging from about 250° F. to about 600° F. for a sufficient time to cause a chemical change and bring about a final curing of the said alcohol which bonds together the particulate metal.

10. The process of claim 9 wherein the alcohol employed is one containing from about 8 to about 16 carbon atoms in the molecule, and the alcohol is employed in concentration of from about 1 to about 2 percent.

11. The process of claim 9 wherein the particulate iron metal employed in forming a briquette is from about 70 to about 95 percent metallized and resultant from a fluidized iron ore reduction process.

12. The process of claim 9 wherein the pressures employed in forming the briquette range from about 50,000 to about 100,000 pounds per square inch.

13. The process of claim 9 wherein the briquette is treated at temperatures ranging from about 350° F. to about 500° F.

14. The process of claim 9 wherein the heat treatment ranges from about 1 hour to about 24 hours.

15. An article of manufacture, comprising a briquette formed and treated by
 admixing particulate reduced iron metal with a monohydric primary alcohol containing from about 6 to about 30 carbon atoms, in concentration ranging from about 1 to about 4 percent, based on the weight of the iron,
 pressing the mixture between opposing surfaces at pressures ranging from about 20,000 pounds per square inch and higher to form a briquette, the briquette treated in an oxygen-containing atmosphere at temperatures ranging from about 250° F. to about 600° F. for a sufficient time to cause a chemical change and bring about a final curing of the said alcohol which bonds together the particulate metal.

No references cited.

ROBERT F. WHITE, *Primary Examiner.*

J. R. HALL, *Assistant Examiner.*